United States Patent
Merlo et al.

(10) Patent No.: US 10,446,865 B2
(45) Date of Patent: Oct. 15, 2019

(54) LIQUID COMPOSITION FOR PROTON EXCHANGE MEMBRANES

(71) Applicant: SOLVAY SPECIALTY POLYMERS ITALY S.P.A., Bollate (IT)

(72) Inventors: Luca Merlo, Montorfano (IT); Stefano Tonella, Corbetta (IT); Martina Corasaniti, Caronno Pertusella (IT); Claudio Oldani, Parabiago (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 82 days.

(21) Appl. No.: 15/520,767

(22) PCT Filed: Oct. 14, 2015

(86) PCT No.: PCT/EP2015/073777
§ 371 (c)(1),
(2) Date: Apr. 20, 2017

(87) PCT Pub. No.: WO2016/062591
PCT Pub. Date: Apr. 28, 2016

(65) Prior Publication Data
US 2017/0317369 A1    Nov. 2, 2017

(30) Foreign Application Priority Data
Oct. 20, 2014    (EP) .................................... 14189535

(51) Int. Cl.
| | |
|---|---|
| *H01M 8/10* | (2016.01) |
| *C08J 5/22* | (2006.01) |
| *C09D 127/18* | (2006.01) |
| *C09D 127/12* | (2006.01) |
| *C08L 27/12* | (2006.01) |
| *H01M 8/1044* | (2016.01) |
| *H01M 8/1081* | (2016.01) |

(52) U.S. Cl.
CPC ........... *H01M 8/1044* (2013.01); *C08J 5/225* (2013.01); *C08J 5/2281* (2013.01); *C08L 27/12* (2013.01); *C09D 127/12* (2013.01); *C09D 127/18* (2013.01); *H01M 8/1081* (2013.01); *C08J 2327/22* (2013.01); *C08J 2427/12* (2013.01); *C08L 2205/02* (2013.01); *C08L 2205/025* (2013.01); *Y02P 70/56* (2015.11)

(58) Field of Classification Search
CPC .... H01M 8/1044; H01M 8/1081; C08J 5/225; C08J 5/2281; C08J 2327/22; C08J 2427/12; C09D 127/18; C09D 127/12; C08L 27/12; C08L 2205/025; C08L 2205/02
USPC ......................................................... 521/27
See application file for complete search history.

(56) References Cited

U.S. PATENT DOCUMENTS

| | | | |
|---|---|---|---|
| 2002/0014405 A1* | 2/2002 | Arcella | B01D 71/32 204/296 |
| 2002/0144899 A1 | 10/2002 | Arcella et al. | |
| 2002/0144944 A1 | 10/2002 | Arcella et al. | |
| 2005/0239912 A1 | 10/2005 | Arcella et al. | |
| 2007/0148517 A1 | 6/2007 | Merlo et al. | |
| 2010/0044616 A1* | 2/2010 | Fuller | C08J 5/2281 252/62.2 |
| 2010/0047657 A1* | 2/2010 | MacKinnon | C08J 5/2275 429/493 |
| 2010/0297523 A1 | 11/2010 | Merlo et al. | |
| 2012/0295117 A1 | 11/2012 | Iizuka et al. | |
| 2013/0022894 A1* | 1/2013 | Zou | H01M 8/1023 429/494 |

FOREIGN PATENT DOCUMENTS

| | | |
|---|---|---|
| EP | 1172382 A2 | 1/2002 |
| EP | 1323751 A2 | 7/2003 |

OTHER PUBLICATIONS

Subianto, S., et al., "Physical and chemical modification routes leading to improved mechanical properties of perfluorosulfonic acid membranes for PEM fuel cells", Journal of Power Source, 2013, vol. 233, pp. 216-230—Elsevier.
Cooper K.R. "Characterizing through-plane and in-plane ionic conductivity of polymer electrolyte membranes", ECS Transaction, 2011, vol. 41, No. 1, p. 1371-1380.
Dillard D.A. et al., "On the use of pressure-loaded blister test to characterize the strenght and durability of proton exchange membranes", Journal of Fuel Cell Science and Technology, 2009, Vol. 6, No. 3.
Cooper K.R. "In situ PEMFC fuel crossover & electrical short circuit measurement", Fuel Cell Magazine, 2008 (Aug./Sep.), p. 34-35.

* cited by examiner

Primary Examiner — Michael Bernshteyn

(57) ABSTRACT

The present invention relates to a liquid composition comprising a polymer bearing —SO3H groups and a perfluoroelastomer, a method for manufacturing said liquid composition and an article manufactured by using said composition. Preferably, said article is a proton exchange membrane, which shows at the same time good mechanical resistance and electrochemical properties and is useful for example as separator in fuel cells.

18 Claims, 4 Drawing Sheets

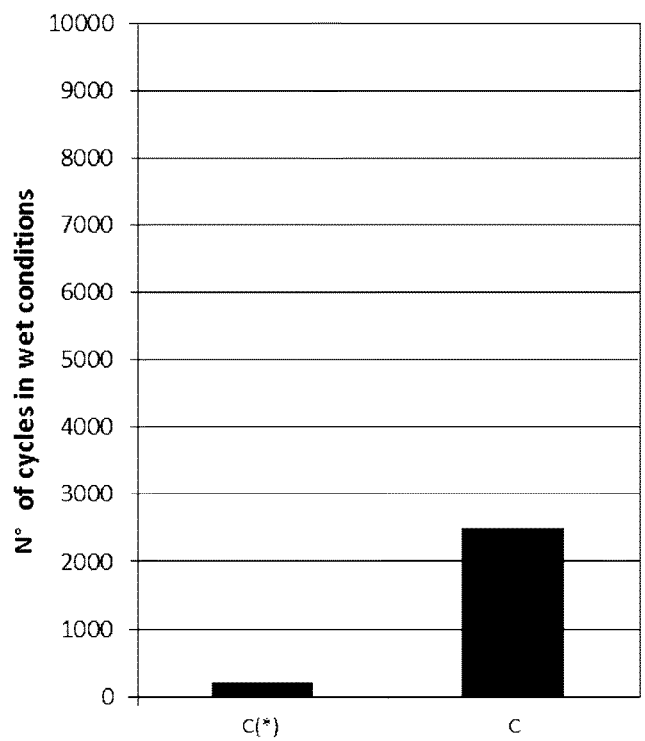
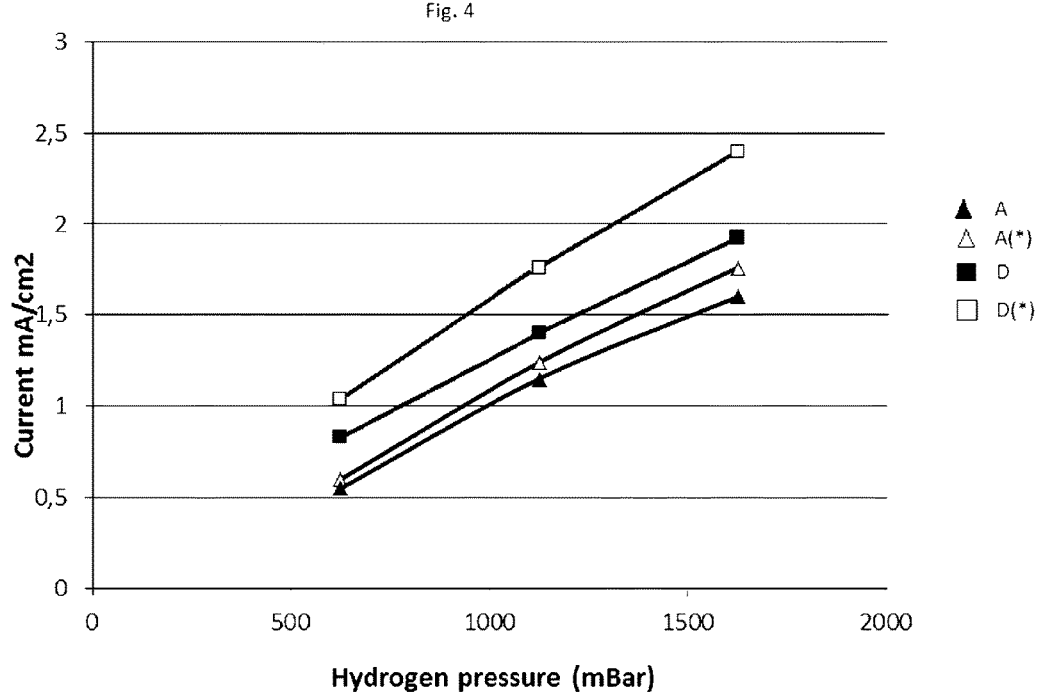

LIQUID COMPOSITION FOR PROTON EXCHANGE MEMBRANES

CROSS-REFERENCE TO RELATED APPLICATION

This application is a U.S. national stage entry under 35 U.S.C. § 371 of International Application No. PCT/EP2015/073777 filed Oct. 14, 2015, which claims priority to European application No. 14189535.9 filed on Oct. 20, 2014. The entire contents of these applications are explicitly incorporated herein by this reference.

TECHNICAL FIELD

The present invention relates to a liquid composition for the manufacture of proton exchange membranes that are useful as separators in fuel cells.

BACKGROUND ART

Fluorinated polymers containing sulfonic acid functional groups, due to their ion conducting properties, have found widespread use in the manufacture of electrolyte membranes for electrochemical devices such as electrolysis cells and fuel cells. Notable examples are for instance proton exchange membrane (PEM) fuel cells which employ hydrogen as the fuel and oxygen or air as the oxidant.

Generally, said membranes require excellent ion conductivity, gas barrier properties (to avoid the direct mixing of hydrogen and oxygen), mechanical strength and chemical and thermal stability at the operating conditions of the cell.

During use, the membranes have to withstand three different membrane degradation mechanisms, i.e. chemical, thermal and mechanical degradation. The latter is known to cause early life failures due to perforations, cracks, tears and pinholes.

Several approaches have been developed in the art to improve the mechanical stability of the membranes, with the final aim to increase their durability and lifetime. Typically, these approaches comprise chemical cross-linking, mechanical reinforcement by inorganic fillers and reinforcement with a mechanically stable polymeric matrix. A review of these approaches has been provided by SUBIANTO, S., et al. Physical and chemical modification routes leading to improved mechanical properties of perfluorosulfonic acid membranes for PEM fuel cells. *Journal of Power Source*. 2013, vol. 233, p. 216-230.

However, while on the one hand the use of inert reinforcements improves the mechanical properties of the membranes, on the other hand it results in a reduction in proton conductivity, with a consequent worsening the electrochemical properties of the membrane.

It has also been disclosed in the art that a sulphonic ionomer can be mixed with a fluoroelastomer.

For example, US 2013/0022894 (GM GLOBAL TECHNOLOGY OPERATIONS, LLC) 24 Jan. 2013, US 2010/0044616 (GM GLOBAL TECHNOLOGY OPERATIONS, INC.) 25 Feb. 2010 and US 2010/047657 (GM GLOBAL TECHNOLOGY OPERATIONS, INC) 25 Feb. 2010 disclose blends of perfluorosulfonic acid ionomers with Kynar® 2751, that is a partially fluorinated copolymer of vinylidene fluoride and hexafluoropropylene.

US 2005/0239912 (SOLVAY SOLEXIS S.P.A.) generally discloses that a ionomer can be mixed with a fluoroelastomer, for example a TFE/perfluoromethylvinyl ether copolymer, in an amount between 0 and 50% by weight with respect to the ionomer. The ionomer and the fluoroelastomer mixture can be physical blend of solid polymers or of polymerization latexes.

However, this application discloses no specific composition comprising a ionomer and a fluoroelastomer, nor provide any detailed indication on how mixing latexes in order to avoid coagulation of ingredients thereby contained.

US 2002/0014405 (AUSIMONT S.P.A.) also generally discloses that a ionomer can be mixed with a fluoroelastomer, for example a TFE/perfluoromethylvinyl ether copolymer, in an amount between 0 and 50% by weight with respect to the ionomer. The ionomer and the fluoroelastomer mixture can be physical blend of solid polymers or of polymerization latexes. In addition, this application exemplifies membranes obtained by physically blending a solid mixture of a ionomer and a perfluoroelastomer copolymer TFE/perfluoromethylvinylether, molding in press the blend to obtain a film and then, acidifying the film to completely transform the —$SO_2F$ groups into sulphonic groups —$SO_3H$.

However, the physical blend does not allow forming a mixture wherein the solid ionomer and the solid perfluoroelastomer are homogeneously dispersed. Also, said physical blends have little use from the industrial point of view, as they cannot be used to prepare membranes by casting techniques or by impregnating nano-porous supports.

On the other hand, when blending latexes of the two different polymers, the two latexes are known to show different colloidal behaviour, so that fluoroelastomer latex, more sensitive to coagulation phenomena, may coagulate and separate from the mixture, hence rending mixing totally ineffective.

SUMMARY OF INVENTION

Despite the efforts made in the art, the inventors perceived that there is still the need of providing materials suitable for the manufacture of proton exchange membranes having at the same time good mechanical resistance and electrochemical properties.

Thus, the inventors faced the problem to provide a composition suitable for the manufacture of a proton exchange membrane having increased mechanical stability, without worsening its electrochemical property.

Thus, in a first aspect, the present invention relates to a composition [composition (C)] comprising:
- a liquid medium [medium (L)];
- at least one polymer [component (I)] comprising recurring units derived from at least one ethylenically unsaturated fluorinated monomer containing at least one —$SO_3Z$ group wherein Z is H, an alkaline metal ion or $NH_4^+$ [monomer (A)] and recurring units derived from at least one ethylenically unsaturated fluorinated monomer [monomer (B)]; and
- at least one perfluoroelastomer [component (II)], wherein the weight ratio between said component (I) and said component (II) is from 95/5 to 70/30.

The inventors have surprisingly found that when the component (I) in its acidic or salified form is provided in a liquid medium in combination with component (II) in the above recited weight ratios, a composition is obtained which is stable against coagulation and which can be easily processed through liquid processing techniques (such as casting, impregnation) for manufacturing membranes.

Further, advantageously, the inventors have found that when the weight ratio between said components (I) and (II) is within the range from 95/5 to 70/30, a proton exchange membrane having at the same time outstanding mechanical properties and good electrochemical properties is obtained.

Then, in a second aspect, the present invention relates to a method for manufacturing said composition (C), said method comprising the steps of:

(i) providing a composition [composition (C1)] comprising component (I) in a first liquid medium [medium (I)];

(ii) diluting said composition (C1) with a liquid medium [medium (d)], so as to obtain a diluted composition [composition (dC1)] in a diluted liquid medium [medium (dI)] comprising said component (I) in an amount of less than 10 wt. % with respect to the total weight of said composition (dC1);

(iii) mixing said composition (dC1) with a composition [composition (02)] comprising component (II) in a second liquid medium [medium (II)], so as to provide a diluted mixed composition (dC3) in a third liquid medium [medium (III)] comprising a weight ratio of said component (I) to said component (II) of from 95/5 to 70/30, and (iv) partially removing said medium (III) from said composition (dC3), so as to provide for composition (C) comprising medium (L), component (I) and component (II), wherein said component (I) and said component (II) are in an amount of at least 15 wt. % based on the total weight of said composition.

Advantageously, the inventors have found that when in step (ii) the composition (C1) comprising component (I) is diluted such that the weight ratio of said component (I) is less than 10 wt. % based on the total weight of said composition (C1), a stable liquid composition is obtained.

As used within the present description and in the following claims, the expression "stable liquid composition" is intended to indicate a composition wherein component (II) does not coagulate despite the presence of component (I) in its acid or salified form. On this regard, it is well known in the art that compositions in the form of latexes comprising (per)fluoroelastomers are coagulated by addition of acid compounds, such as for example nitric acid or electrolytes (such as salts).

Then, in a third aspect, the present invention relates to an article comprising said composition (C).

In a preferred embodiment, said article is a proton exchange membrane for fuel cell application, herein referred to also as a "membrane".

The inventors have surprisingly found that, although the perfluoroelastomer is an inert material, the use of the specific ratio between said component (I) and said component (II) does not negatively affect the electrochemical properties of the membrane, in particular its ionic conductivity.

It was found that comparative compositions comprising a fluorinated ionomer and an elastomer formed of recurring units that comprise more than 10% in weight over the total weight of the elastomer of monomers comprising hydrogen atoms, optionally in addition to fluorine atoms, (i.e. a non-perfluorinated elastomer) are remarkably less stable in open circuit voltage (OCV) hold tests in a fuel cell apparatus than the compositions of the invention, and behave substantially like a membrane obtained using the fluorinated ionomer alone.

Without being bound by any theory, the inventors believe that the perfluoroelastomer in the composition according to the present invention increases the mechanical stability of the membrane due to the very similar chemical nature with the ethylenically unsaturated fluorinated monomer.

In a further aspect, the present invention relates to a method for manufacturing a membrane comprising casting said composition (C) and/or impregnating said composition (C) onto a porous support.

BRIEF DESCRIPTION OF DRAWINGS

FIG. 3 shows the results of a blister test, performed as explained in Example 5 below.

FIG. 4 shows the results of the hydrogen permeability test, performed as explained in Example 6 below.

DETAILED DESCRIPTION OF THE INVENTION

Figure 1:
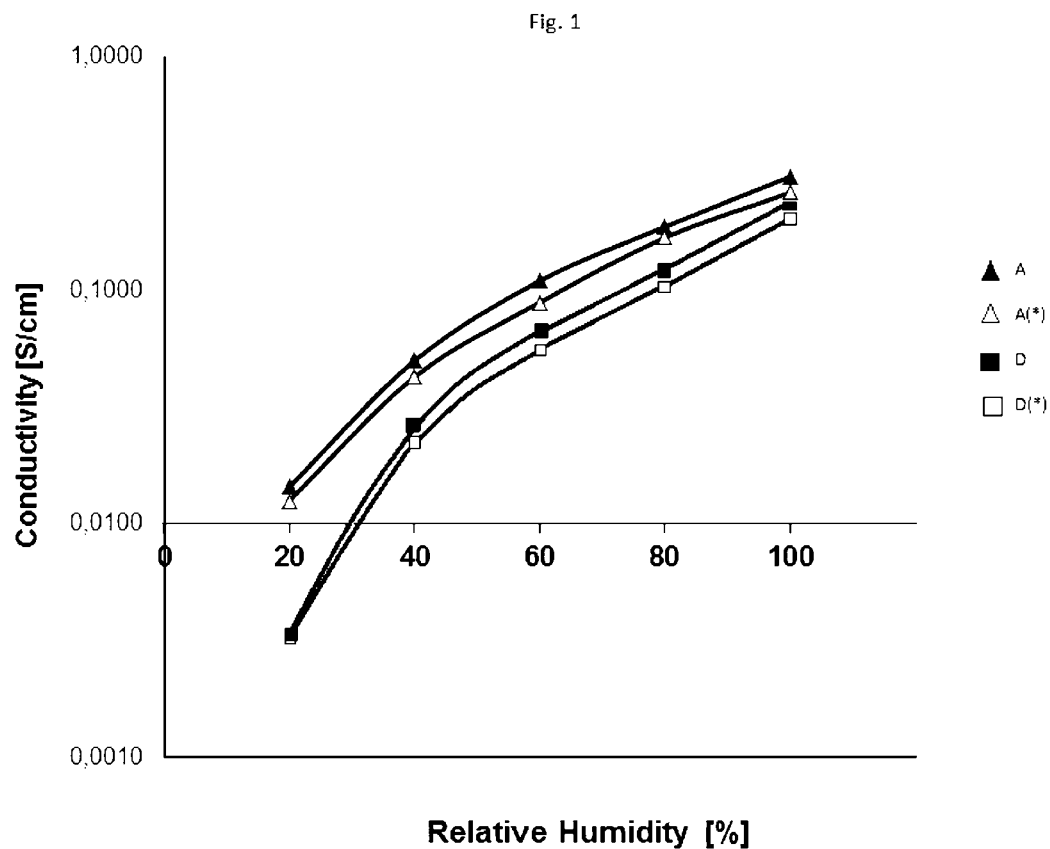
FIG. 1 shows the results of the ion conductivity test, performed as explained in Example 3 below.

Unless otherwise specified, in the context of the present invention, all percentages are relative to the ratio of the weight of a specific component of a mixture divided by the total weight of the mixture (indicated as wt/wt).

Preferably, the weight ratio between said component (I) and said component (II) is from 90/10 to 80/20. In a preferred embodiment, said ratio is 85/15.

Said medium (L) generally comprises at least one of the group consisting of water, alcohols, high-boiling-point solvents and mixtures thereof.

Suitable alcohols are selected from the group comprising methanol, ethanol, propyl alcohols (i.e. isopropanol, n-propanol), butyl alcohols, ethylene glycol and diethylene glycol.

Suitable high-boiling-point solvents are selected from dimethylacetamide (DMA), dimethylformamide (DMF), dimethyl sulfoxide (DMSO), N-methyl-pyrrolidone (NMP), N-ethyl-pyrrolidone (NEP).

Said high-boiling-point solvents are also useful for filming purposes.

Preferably, said medium (L) is a liquid medium comprising water.

The aqueous liquid medium (i.e. liquid medium comprising water) generally comprises water as major component, generally in an amount of at least 51 wt. % based on the amount of said medium (L). Minor amount of other liquid media, such as alcohols and/or high-boiling-point solvents, as detailed above, can be present.

A liquid medium comprising water is advantageous from the industrial point of view in terms of cost and safety and is also beneficial for the environment.

In a preferred embodiment, said medium (L) is selected from water, a water/alcohol mixture and alcohols.

More preferably, said medium (L) is water or a water/alcoholic mixture.

Preferably, said water/alcoholic mixture comprises from 40 wt. % to 70 wt. % of water and from 60 wt. % to 30 wt. % of alcohol, more preferably from 50 wt. % to 70 wt. % of water and from 50 wt. % to 30 wt. % of alcohol.

Preferably, said composition (C) comprises an amount of component (I) of from about 1 wt. % to about 40 wt. %, more preferably from about 5 wt. % to about 35 wt. % based on the total weight of said composition Preferably, said composition (C) comprises an amount of component (II) of from about 0.05 wt. % to about 18 wt. % based on the total weight of said composition.

Preferably, said composition (C) comprises a total amount of component (I) and component (II) of from about 5 wt. % to about 45 wt. %, more preferably from about 10 wt. % to about 40 wt. %, and even more preferably from about 15 wt. % to about 35 wt. % based on the total weight of said composition.

As defined above, component (I) according to the present invention comprises recurring units derived from at least one ethylenically unsaturated fluorinated monomer containing at least one —SO$_3$Z group wherein Z is H, an alkaline metal ion or NH$_4^+$ [monomer (A)] and at least one ethylenically unsaturated fluorinated monomer [monomer (B)].

The expression "at least one monomer" is used within the present description and in the following claims with reference to both monomers (A) and (B) to indicate that one or more than one monomer of each type can be present in the polymer. Hereinafter the term "monomer" will be used to refer to both one and more than one monomer of a given type.

The expression "alkaline metal ion" is used within the present description and in the following claims to indicate an ion of one of the following alkaline metals: Li, Na, K, Rb, Cs.

Preferably, the alkaline metal is selected from Li, Na, K.

Preferably, said monomer (A) is selected from the group comprising:

CF$_2$=CF(CF$_2$)$_p$SO$_3$Z wherein p is an integer between 0 and 10, preferably between 1 and 6, more preferably p is equal to 2 or 3, and wherein preferably Z is as defined above;

CF$_2$=CF—O—(CF$_2$)$_m$SO$_3$Z wherein m is an integer between 1 and 10, preferably between 1 and 6, more preferably between 2 and 4, even more preferably m equals 2, and wherein preferably Z is as defined above;

CF$_2$=CF—(OCF$_2$CF(R$_{F1}$))$_w$—O—CF$_2$(CF(R$_{F2}$))$_y$SO$_3$Z wherein w is an integer between 0 and 2, R$_{F1}$ and R$_{F2}$, equal or different from each other, are independently F, Cl or a C$_1$-C$_{10}$ fluoroalkyl group, optionally substituted with one or more ether oxygen atoms, y is an integer between 0 and 6; preferably w is 1, R$_{F1}$ is —CF$_3$, y is 1 and R$_{F2}$ is F, and wherein preferably Z is as defined above;

CF$_2$=CF—Ar—SO$_3$Z wherein Ar is a C$_5$-C$_{15}$ aromatic or heteroaromatic substituent, and wherein preferably Z is as defined above.

Even more preferably, said monomer (A) is CF$_2$=CF—O—(CF$_2$)$_m$—SO$_3$H, wherein m is an integer between 1 and 6, preferably between 2 and 4.

In a preferred embodiment, said monomer (A) is CF$_2$=CFOCF$_2$CF$_2$—SO$_3$H. Preferably, said monomer (B) is selected from the group comprising:

C$_2$-C$_8$ fluoroolefins, such as tetrafluoroethylene, pentafluoropropylene, hexafluoropropylene, and hexafluoroisobutylene;

Vinylidene fluoride;

C$_2$-C$_8$ chloro- and/or bromo- and/or iodo-fluoroolefins, such as chlorotrifluoroethylene and bromotrifluoroethylene;

fluoroalkylvinylethers of formula CF$_2$=CFOR$_{f1}$, wherein R$_{f1}$ is a C$_1$-C$_6$ fluoroalkyl, e.g. —CF$_3$, —C$_2$F$_5$, —C$_3$F$_7$;

fluoro-oxyalkylvinylethers of formula CF$_2$=CFOR$_{O1}$, wherein R$_{O1}$ is a C$_1$-C$_{12}$ fluoro-oxyalkyl having one or more ether groups, for example perfluoro-2-propoxy-propyl;

fluoroalkyl-methoxy-vinylethers of formula CF$_2$=CFOCF$_2$OR$_{f2}$ in which R$_{f2}$ is a C$_1$-C$_6$ fluoroalkyl, e.g. —CF$_3$, —C$_2$F$_5$, —C$_3$F$_7$ or a C$_1$-C$_6$ fluorooxyalkyl having one or more ether groups, like —C$_2$F$_5$—O—CF$_3$;

fluorodioxoles, of formula:

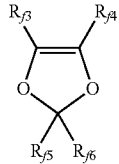

wherein each of R$_{f3}$, R$_{f4}$, R$_{f5}$, R$_{f6}$, equal or different each other, is independently a fluorine atom, a C$_1$-C$_6$ fluoro(halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

More preferably, said monomer (B) is selected from the group comprising:

C$_3$-C$_8$ fluoroolefins, preferably tetrafluoroethylene and/or hexafluoropropylene;

chloro- and/or bromo- and/or iodo-C$_2$-C$_6$ fluoroolefins, like chlorotrifluoroethylene and/or bromotrifluoroethylene;

fluoroalkylvinylethers of formula CF$_2$=CFOR$_{f1}$ in which R$_{f1}$ is a C$_1$-C$_6$ fluoroalkyl, e.g. —CF$_3$, —C$_2$F$_5$, —C$_3$F$_7$;

fluoro-oxyalkylvinylethers of formula CF$_2$=CFOR$_{O1}$, in which R$_{O1}$ is a C$_1$-C$_{12}$ fluorooxyalkyl having one or more ether groups, like perfluoro-2-propoxy-propyl.

In a preferred embodiment, said monomer (B) is tetrafluoroethylene (TFE).

Optionally, in addition to monomers (A) and (B), component (I) may comprise recurring units derived from bis-olefins.

Non limiting examples of suitable bis-olefins are selected from those of formulae below:

R$_1$R$_2$C=CH—(CF$_2$)$_j$—CH=CR$_3$R$_4$ wherein j is an integer between 2 and 10, preferably between 4 and 8, and R$_1$, R$_2$, R$_3$, R$_4$, equal or different from each other, are —H, —F or C$_1$-C$_5$ alkyl or (per)fluoroalkyl group;

A$_2$C=CB—O-E-O—CB=CA$_2$, wherein each of A, equal or different from each other, is independently selected from —F, —Cl, and —H; each of B, equal or different from each other is independently selected from —F, —Cl, —H and —OR$_B$, wherein R$_B$ is a branched or straight chain alkyl radical which can be partially, substantially or completely fluorinated or chlorinated; E is a divalent group having 2 to 10 carbon atoms, optionally fluorinated, which may be inserted with ether linkages; preferably E is a —(CF$_2$)$_z$— group, with z being an integer from 3 to 5; and R$_6$R$_7$C=CR$_5$-E-O—CB=CA$_2$, wherein E, A and B have the same meaning as above defined; R$_5$, R$_6$, R$_7$, equal or different from each other, are —H, —F or C$_1$-C$_5$ alkyl or fluoroalkyl group.

When a bis-olefin is employed in the polymerization process of the invention, the resulting polymer typically comprises from 0.01% to 5% by moles of units deriving from the bis-olefin with respect to the total amount of units in the polymer.

The equivalent weight (EW) (i.e. grams of component (I) per mole of functional groups) of component (I) is not particularly limited, preferably component (I) has an EW between 500 g/eq and 1400 g/eq.

Component (I) is generally obtained from hydrolysis of corresponding polymer precursor comprising recurring units derived from at least one ethylenically unsaturated fluorinated monomer containing at least one —$SO_2F$ group [monomer (A')] and recurring units derived from at least one ethylenically unsaturated fluorinated monomer [monomer (B)].

Monomer (A') possesses features above described for monomer (A) except that the groups —$SO_3Z$ above described in combination with monomer (A) are replaced in monomer (A') by group —$SO_2F$.

Monomer (B) possesses all features, as above described for component (I).

The hydrolysis of the polymer precursor can be advantageously carried out according to methods known in the art, for example by first contacting the polymer precursors with an alkaline aqueous solution, generally at a temperature from 60° C. to 100° C., and then with a mineral acid aqueous solution.

The ionomer precursors may be conveniently obtained by any polymerization process known in the art. Suitable processes for the preparation of the sulfonyl fluoride polymers are for instance those described in EP 1323751 A (SOLVAY SOLEXIS SPA) and EP 1172382 A (SOLVAY SOLEXIS SPA)

As defined above, component (II) is a perfluoroelastomer, i.e. an amorphous fully fluorinated polymer consisting essentially of recurring units derived from at least one perfluorinated monomer.

The expression "consisting essentially of recurring units derived from at least one perfluorinated monomer" is intended to indicate that minor amounts of recurring units derived from non-perfluorinated monomers are tolerated in the perfluoroelastomer, typically below 2%, below 1% or below 0.1% in weight over the total weight of component (II).

Preferably, said at least one fluorinated monomer is selected from the group comprising:
- $C_3$-$C_8$ perfluoroolefins, such as tetrafluoroethylene (TFE) and hexafluoropropene (HFP);
- $CF_2$=$CFOR_f$ (per)fluoroalkylvinylethers (PAVE) wherein $R_f$ is a $C_1$-$C_6$ perfluoroalkyl group, for example $CF_3$, $C_2F_5$, $C_3F_7$;
- chloro- and/or bromo- and/or iodo-$C_2$-$C_6$ fluoroolefins, such as chlorotrifluoroethylene (CTFE); and
- perfluorodioxoles.

More preferably, said component (II) comprises recurring units derived from $C_3$-$C_8$ perfluoroolefins and $CF_2$=$CFOR_f$ (per)fluoroalkylvinylethers wherein $R_f$ is a $C_1$-$C_6$ perfluoroalkyl group.

Even more preferably, said component (II) comprises recurring units derived from tetrafluoroethylene (TFE) and perfluoromethyl-vinyl-ether (MVE).

Preferably, said component (II) comprises cure sites comprising at least one iodine or bromine atom, more preferably at least one iodine atom. Said cure sites can be comprised as pending groups in recurring units of the perfluoroelastomer or can be present as end chains in the same. Embodiments wherein component (II) comprises iodine atoms in its end chains are preferred.

In a preferred embodiment, composition (C) according to the present invention is a dispersion, i.e. a composition wherein component (I) and component (II) are in form of solid particles dispersed in a continuous phase comprising medium (L), such that the solid particles do not coagulate or precipitate in the continuous phase.

Preferably, composition (C1) comprises component (I) in the form of solid particles having a particle size of from about 20 nm to about 180 nm, more preferably from about 30 nm to about 150 nm, measured by laser light scattering.

Preferably, composition (C2) comprises component (II) in the form of solid particles having a particle size of less than about 110 nm, more preferably less than about 90 nm, measured by laser light scattering.

Preferably, component (II) is in the form of solid particles having a particle size higher than 10 nm, more preferably higher than 20 nm, measured by laser light scattering.

Preferably, component (II) is in the form of solid particles having a particle size between 30 nm and 80 nm, more preferably between 40 nm and 70 nm, measured by laser light scattering.

Both component (I) and component (II) are in the form of solid particles having a particle size of less than 150 nm, which advantageously allow to obtain a highly uniform blend of composition (C1) and composition (C2). Without being bound by any theory, the inventor believe that the high uniformity of the blend allows to prepare membranes having stable ionic conductivity, despite the presence of component (II), which is non-conductive.

The composition according to the present invention can further comprise a peroxidic initiator and a curing agent.

Preferably, said peroxidic initiator is selected from organic peroxide molecules, for example 2,5-bis(tert-butylperoxy)-2,5-dimethylhexane (commercially available under trade name Luperox® 101).

Preferably, said curing agent is selected from bis-olefins as defined above and 1,3,5-triallyl-1,3,5-triazine-2,4,6(1H,3H,5H)-trione (commercially available as triallyl isocyanurate—TAIC). More preferably, said curing agent is selected from bis-olefins as defined above.

Generally, in the process according to the present invention, said medium (I), medium (d) and medium (II), each independently, are selected from the group detailed above with respect to medium (L).

Preferably, under step (i) of the process according to the present invention, said composition (C1) is a dispersion of component (I) in said medium (I), i.e. a composition wherein component (I) is in form of solid particles dispersed in medium (I) as continuous phase, such that the solid particles of component (I) do not coagulate or precipitate in medium (I).

In a preferred embodiment, said medium (I) is water.

Preferably, under step (ii) of the process according to the present invention, said medium (d) is the same as medium (I).

It will be clear to the skilled person that the composition of medium (dI) depends on the type of said medium (I) and medium (d) and on their mixing ratio.

Preferably, under step (iii) of the process according to the present invention, said composition (C2) is a dispersion of component (II) in said medium (II), i.e. a composition wherein component (II) is in form of solid particles dispersed in medium (II) as continuous phase, such that the solid particles of component (II) do not coagulate or precipitate in medium (II).

In a preferred embodiment, said medium (II) is water.

It will be clear to the skilled person that the composition of medium (III) depends on the type of said medium (dI) and medium (II) and on their mixing ratio.

Preferably, step (iii) is performed at a temperature between 0° C. and 100° C., more preferably between 10° C. and 80° C., even more preferably at room temperature (i.e. between 20° C. and 30° C.).

Preferably, said step (iii) is performed under shear by avoiding the formation of bubbles.

Preferably, the weight ratio between said component (I) and said component (II) obtained in step (iii) is from 90/10 to 80/20, more preferably 85/15.

Preferably, under step (iv), composition (C) comprises component (I) and component (II) in an amount of less than 50 wt. % based on the total weight of said composition (C).

Preferably, step (iv) of the process according to the present invention is performed by evaporating, at least partially, said medium (III).

The skilled person can easily determine the preferred conditions for evaporating said medium (III), depending on the type of medium (III) and on the desired solid content of the final composition.

For example, when said medium (III) is water, said step (iv) can be performed at a temperature between 50° C. and 70° C., at ambient pressure.

Optionally, the process according to the present invention may comprise after step (iv), step (v) of mixing said composition (C) as obtained in step (iv) with at least one liquid medium [medium (IV)], so as to provide a composition (Ci) comprising medium (Li), component (I) and component (II).

Preferably, said medium (IV) is as medium (I) detailed above.

The skilled person can easily understand that when the method for preparing the composition according to the present invention comprises steps (i) to (iv), composition (C) as detailed above is obtained after step (iv).

When the method for preparing the composition according to the present invention comprises steps (i) to (v), the skilled person can easily understand how to perform steps (i) to (v), such that composition (Ci) obtained after step (v) complies with the definition of composition (C) as detailed above.

In a third aspect, the present invention relates to an article comprising the composition according to the present invention.

In a preferred embodiment, said article is a proton exchange membrane, for example for fuel cell application.

In a fourth aspect, the present invention relates to a method for manufacturing a proton exchange membrane, said method comprising the following steps:

(A) casting the composition as above detailed for obtaining a film or impregnating said composition onto a porous support to obtain an impregnated support;

(B) removing the medium (L) from said film to obtain a dried film or from said impregnated support to obtain a dried impregnated support; and (C) heating said dried film or said dried impregnated support at a temperature between 140° C. and 230° C.

Preferably, said step (B) is performed under conditions suitable for removing water, alcohol and/or water/alcoholic mixtures.

Preferably, said step (B) is performed at a temperature between about 50° C. and 100° C.

Preferably, said step (C) is performed at a temperature between about 170° C. and 210° C.

In a preferred embodiment, said step (B) and said step (C) are performed in a single step (B'), by heating the film or the impregnated support obtained in step (A) at a temperature between 140° C. and 230° C.

Suitable porous supports may be made from a variety of components. The porous supports may be made from hydrocarbon polymers such as woven or non-woven polyolefin membranes, e.g. polyethylene or polypropylene, or polyesters, e.g. poly(ethylene terephthalate). Porous supports of fluorinated polymers are generally preferred for use in fuel cell applications because of their high chemical inertia, high compatibility with the other materials and high control of porosity. Biaxially expanded PTFE porous supports (otherwise known as ePTFE membranes) are among preferred supports. These supports are notably commercially available under trade name GORE-TEX® or TETRATEX®.

Advantageously, in embodiments wherein component (II) comprises cure sites as defined above and the composition (C) as above detailed further comprises a peroxidic initiator and a curing agent, said step (C) or step (B') are also effective in providing for crosslinking of the said perfluoroelastomer.

Should the disclosure of any patents, patent applications, and publications which are incorporated herein by reference conflict with the description of the present application to the extent that it may render a term unclear, the present description shall take precedence.

The present invention will be now described in more detail with reference to the following examples, whose purpose is merely illustrative and not intended to limit the scope of the invention.

EXAMPLES

Raw Materials

Composition (C1)

Fluorinated ionomer dispersion comprising 75 wt. % of water and 25 wt. % of polymer containing —SO$_3$H functional groups and having EW=700 g/eq—obtained by SOLVAY SPECIALTY POLYMERS ITALY S.p.A.

Fluorinated ionomer dispersion comprising 75 wt. % of water and 25 wt. % of polymer containing —SO$_3$H functional groups and having EW=790 g/eq—obtained by SOLVAY SPECIALTY POLYMERS ITALY S.p.A.

Fluorinated ionomer dispersion comprising 75 wt. % of water and 25 wt. % of polymer containing —SO$_3$H functional groups and having EW=950 g/eq—obtained by SOLVAY SPECIALTY POLYMERS ITALY S.p.A.

Composition (C2)

Perfluoroelastomer comprising 15 wt. % of tetrafluoroethylene (TFE) perfluoromethyl-vinyl-ether (MVE) copolymer under the form of aqueous dispersion—obtained by SOLVAY SPECIALTY POLYMERS ITALY S.p.A.

Example 1—Preparation of the Liquid Compositions

Each of the three aqueous Fluorinated ionomer dispersions were diluted with water until a content of said component (I) of less than 8 wt. % was reached.

A 500 ml sample of each one of the three diluted dispersions thus obtained was then mixed with the proper amount of an aqueous dispersion of perfuoroelastomer, under shear but avoiding the formation of bubbles, until the desired solid ratio between the polymer (i.e. component (I)) and the perfluoroelastomer (i.e. component (II)) was reached.

The following dispersions were obtained:

TABLE 1

| Dispersion | Fluorinated Ionomer (I) | Weight ratio (I)/(II) |
|---|---|---|
| 1 | EW = 700 g/eq | 85/15 |
| 2 | EW = 790 g/eq | 85/15 |
| 3 | EW = 950 g/eq | 85/15 |
| 4C(*) | EW = 950 g/eq | 65/35 |
| 5C(*) | EW = 700 g/eq | 65/35 |

(*)comparison

The aqueous dispersions 1, 2, 3, 4C(*) and 5C(*) were each concentrated by removing water by evaporation at 60° C. and ambient pressure, until said components (I) and (II) were in a total amount of 25 wt. % based on the total amount of the aqueous dispersion.

The concentrated dispersion was then formulated by addition of 1-propyl alcohol until the final composition of the liquid medium was 66% water and 34% alcohol.

The final dispersion thus obtained contained a total amount of components (I) and (II) of 18 wt. % (corresponding to 15.3 wt. % of component (I) and 2.7 wt. % of component (II)) based on the total weight of said dispersion.

The final dispersion was visually analysed and was found to be uniform, transparent and stable, i.e. no separation of the solid components was observed.

Example 2—Preparation of the Membranes

The dispersions prepared as disclosed according to Example 1 above were then used to prepare cast membranes and reinforced membranes.

The cast membranes were prepared via knife casting. The knife casting process was performed by spreading the dispersions on a knife casting table ZEHNTER ZAA2300 at ambient temperature directly on a glass plate with a speed of 1 cm/sec.

The reinforced membranes were prepared impregnating a support of expanded PTFE (3126 grade from Donaldson, having 70 nm porosity) fixed on a PTFE frame, by immersion in the dispersions for 30 seconds.

The membranes obtained as explained above were then placed in a ventilated oven, at 60° C. for 30 minutes, in order to remove the liquid medium by evaporation.

After that, the membranes were sintered increasing the oven temperature to 190° C., without removing the membranes from the oven and without modifying the ventilation. Once the temperature of 190° C. was reached, the membranes were kept in the oven for 20 minutes.

The following membranes according to the present invention were prepared:

TABLE 2

| Membrane | Dispersion used | Method used | Thick |
|---|---|---|---|
| A | 1 | reinforced | 20 μm |
| B | 1 | cast | 40 μm |
| C | 2 | reinforced | 20 μm |
| D | 3 | cast | 40 μm |
| E | 3 | cast | 50 μm |

As comparison, the following membranes were prepared using the same method disclosed above:

TABLE 3

| Membrane | Dispersion | Method used | Thick |
|---|---|---|---|
| A(*) | Fluorinated ionomer EW = 700 | reinforced | 20 μm |
| B(*) | Fluorinated ionomer EW = 700 | cast | 40 μm |
| C(*) | Fluorinated ionomer EW = 790 | reinforced | 20 μm |
| D(*) | Fluorinated ionomer EW = 950 | cast | 40 μm |
| E(*) | Fluorinated ionomer EW = 950 | cast | 50 μm |
| F(*) | 4C(*) | cast | 40 μm |
| G(*) | 5C(*) | reinforced | 20 μm |

(*)comparison

Example 3—Ion Conductivity

Membranes A, A(*), D and D(*) prepared as disclosed in Example 2 above were tested for their electrochemical performances.

Ionic conductivity was measured as "in plane" conductivity after assembling each of the membranes in Bekktech cells as described by COOPER K. R. "Characterizing through-plane and in-plane ionic conductivity of polymer electrolyte membranes". ECS Transaction. 2011, vol. 41, no. 1, p. 1371-1380.

The results in FIG. 1 showed that the conductivity of the membranes A and D according to the present invention was similar to the comparison membranes A(*) and D(*).

Example 4—Water Up-Take Test

Membranes B and B(*) prepared as disclosed in Example 2 above were tested for water uptake, after treatment in boiling water.

Figure 2:
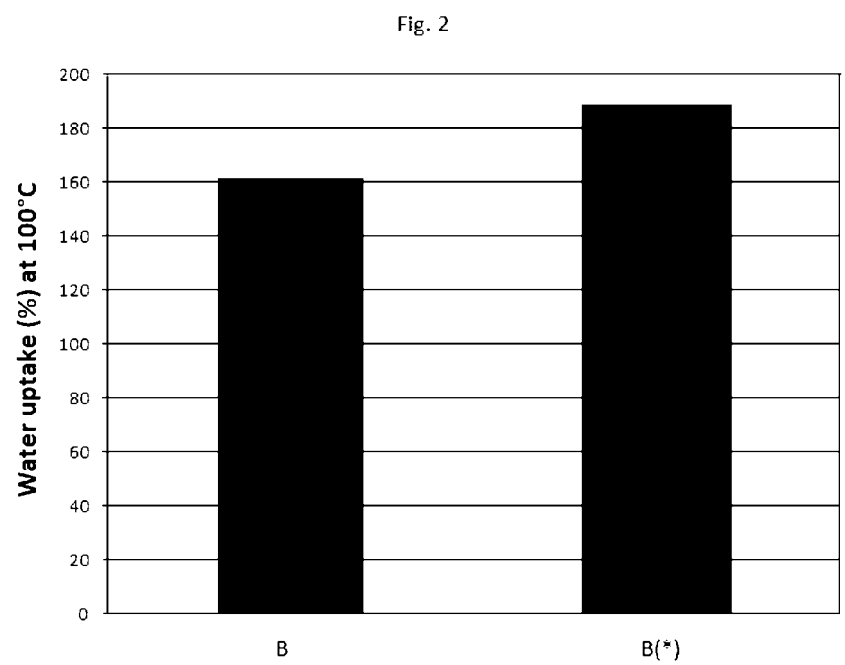
FIG. 2 shows the results of the water uptake test, performed as explained in Example 4 below.

The results in FIG. 2 showed that membrane B according to the present invention had a lower water up-take than comparison membrane B(*), which lead to a higher mechanical stability.

Example 5—Cycles in Wet Conditions

Membranes C and C(*) prepared as disclosed in Example 2 above were tested in an in-house made apparatus similar to that described by DILLARD D. A., et al. On the use of pressure-loaded blister test to characterize the strength and durability of proton exchange membranes. J. Fuel Cell Sci. Technol. 2009, vol. 6, no. 3.

Operating at 80° C., the membranes were subjected to water cycles of pressure between 1 and 2 BarAbs (2 seconds per cycle), until the membranes cracked.

The results in FIG. 3 showed that membrane C according to the present invention had improved mechanical properties than comparison membrane C(*).

Example 6—Hydrogen Permeability Test

Membranes A, A(*), D and D(*) prepared as disclosed in Example 2 above were tested for the permeability to hydrogen.

Permeability to hydrogen was measured as electrochemical hydrogen crossover according to a method known in the art from COOPER K. R. "In situ PEMFC fuel crossover & electrical short circuit measurement". Fuel Cell Magazine. 2008 (August/September), p. 34-35.

The results in FIG. 4 showed that membranes A and D according to the present invention were less permeable to hydrogen than comparison membranes A(*) and D(*).

Example 7—Stability Test Via OCV Hold

Membranes E and E(*) were tested in open circuit voltage (OCV) hold test in a fuel cell apparatus (25 cm² Fuel Cell Technologies cell) coupled with HT400 commercial electrodes (from Solvicore), without any edge protection (i.e. subgasket) applied.

The OCV value was directly correlated to the gas permeability of the membrane. An OCV value of less than 0.85 is associated to increase of gas crossover across the membrane, indicating an irreversible damage. An OCV value of 0.7 was considered as the "end life" point of the membranes.

The test was performed at a temperature of 90° C. and a humidity of 30%, in the presence of hydrogen and oxygen as reactants.

Figure 5:
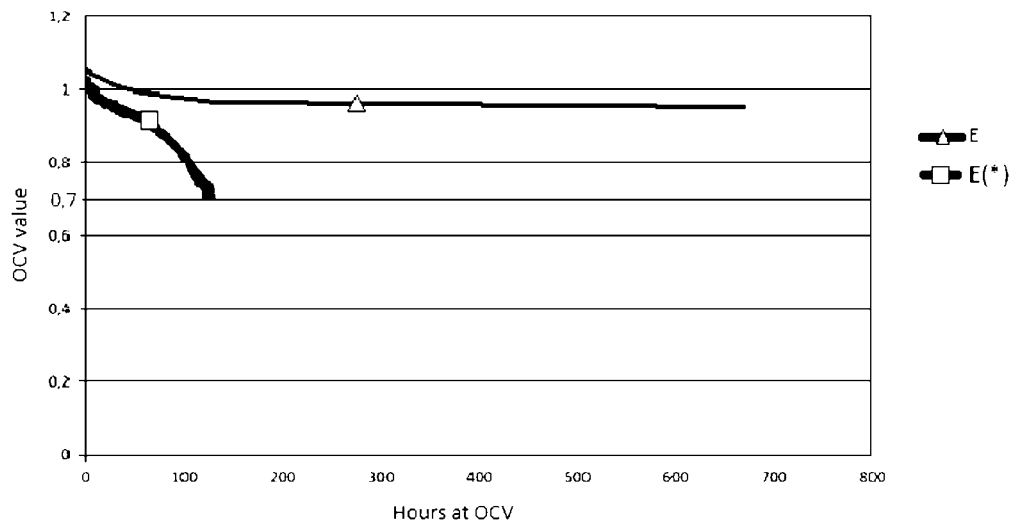
FIG. 5 shows the results of the stability test, performed as explained in Example 7 below.

The results in FIG. 5 showed that after 650 hours of operation, membrane E according to the present invention did not show any degradation. Differently, comparison membrane E(*) showed an OCV value of about 0.8 after 100 hours of operation.

Example 8—Polarization Curves

Polarization curves for membranes A, A(*), D, D(*), F(*) and G(*) were obtained as follows.

Each membrane was incorporated in a corresponding membrane electrode assembly (MEA) with H400 electrodes (from Solvicore) on both anode and cathode sides. The MEA was assembled in a Fuel Cell Technologies 25 cm² cell and conditioned overnight at 75° C., 0.6 V fed with saturated gas (air at stoichiometry 2 and hydrogen at stoichiometry 1.5).

The polarization curves were obtained with a voltage sweep (starting from minimum voltage of 0.4 Volt), recording each current/voltage couple every 5 seconds with voltage steps of 0.005 Volt (not shown in FIGS. 8a and 8b for simplicity). Reactants stoichiometry was kept constant (air=2 and hydrogen=1.5) until a minimum value of 200 sccm for air and 100 sccm for hydrogen.

Figure 6A:
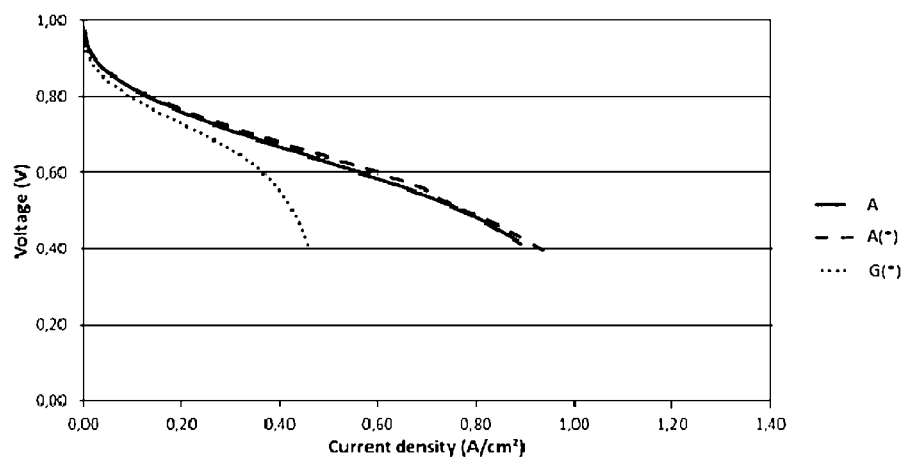
FIGS. 6a and 6b show the polarisation curves obtained as explained in Example 8 below.
Figure 6B:
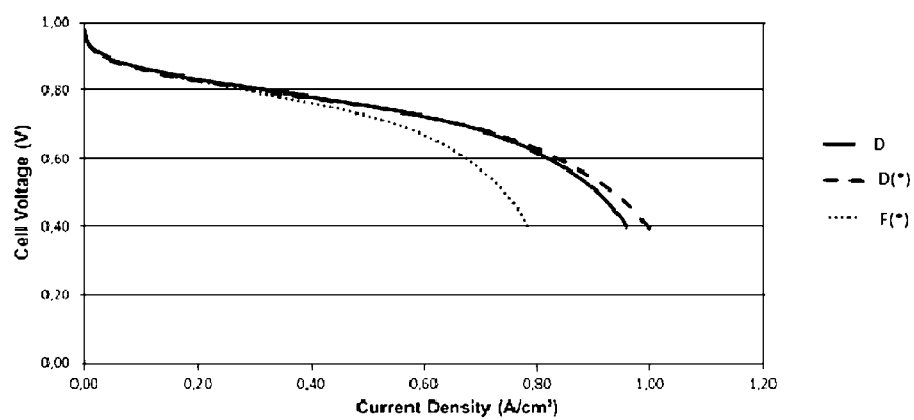

Membrane A, A(*) and G(*) were tested under the following conditions:
cell temperature 90° C.
dew point reactants 65° C.
pressure 1.5 BarAbs
The resulting polarization curves are showed in FIG. 6a.
Membrane D, D(*) and F(*) were tested under the following conditions:
cell temperature 65° C.
dew point reactants 70° C.
pressure 1.5 BarAbs
The resulting polarization curves are showed in FIG. 6b.

The invention claimed is:

1. A composition (C) comprising:
a liquid medium (L);
at least one polymer [component (I)] comprising recurring units derived from at least one ethylenically unsaturated fluorinated monomer containing at least one —$SO_3Z$ group, wherein Z is H, an alkaline metal ion or $NH_4^+$[monomer (A)] and recurring units derived from at least one ethylenically unsaturated fluorinated monomer [monomer (B)]; and
at least one perfluoroelastomer [component (II)], wherein component (II) comprises recurring units derived from $C_3$-$C_8$ perfluoroolefins and $CF_2$=$CFOR_f$ (per)fluoroalkylvinylethers wherein $R_f$ is a $C_1$-$C_6$ perfluoroalkyl group,
wherein the weight ratio between said component (I) and said component (II) is from 95/5 to 70/30.

2. The composition according to claim 1, wherein said weight ratio between said component (I) and said component (II) is from 90/10 to 80/20.

3. The composition according to claim 1, wherein said medium (L) comprises at least one medium selected from the group consisting of water, alcohols, high-boiling-point solvents selected from dimethylacetamide (DMA), dimethylformamide (DMF), dimethyl sulfoxide (DMSO), N-methyl-pyrrolidone (NMP), N-ethyl-pyrrolidone (NEP), and mixtures thereof.

4. The composition according to claim 1, wherein said composition (C) comprises said component (I) in an amount of from 1 wt. % to 40 wt. % based on the total weight of said composition.

5. The composition according to claim 1, wherein said composition (C) comprises said component (II) in an amount of from 0.05 wt. % to 18 wt. % based on the total weight of said composition.

6. The composition according to claim 1, wherein said composition (C) comprises said component (I) and said component (II) in a total amount of from 5 wt. % to 45 wt. % based on the total weight of said composition.

7. The composition according to claim 1, wherein said monomer (A) is selected from the group comprising:
$CF_2$=$CF(CF_2)_pSO_3Z$, wherein p is an integer between 0 and 10 and Z is H, an alkaline metal ion or $NH_4^+$;
$CF_2$=$CF$—$O$—$(CF_2)_mSO_3Z$ wherein m is an integer between 1 and 10 and Z is H, an alkaline metal ion or $NH_4^+$;
$CF_2$=$CF$—$(OCF_2CF(R_{F1}))_w$—$O$—$CF_2(CF(R_{F2}))_y$ $SO_3Z$, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6, and Z is H, an alkaline metal ion or $NH_4^+$; and
$CF_2$=$CF$—$Ar$—$SO_3Z$ wherein Ar is a $C_5$-$C_{15}$ aromatic or heteroaromatic substituent, and Z is H, an alkaline metal ion or $NH_4^+$.

8. The composition according to claim 1, wherein said monomer (B) is selected from the group comprising:
$C_2$-$C_8$ fluoroolefins;
vinylidene fluoride;
$C_2$-$C_8$ chloro- and/or bromo- and/or iodo-fluoroolefins;
fluoroalkylvinylethers of formula $CF_2$=$CFOR_{f1}$, wherein $R_{f1}$ is a $C_1$-$C_6$ fluoroalkyl;
$CF_2$=$CFOR_{O1}$, wherein $R_{O1}$ is a $C_1$-$C_{12}$ fluoro-oxyalkyl having one or more ether groups;
$CF_2$=$CFOCF_2OR_{f2}$ in which $R_{f2}$ is a $C_1$-$C_6$ fluoroalkyl or a $C_1$-$C_6$ fluorooxyalkyl having one or more ether groups;
fluorodioxoles of formula:

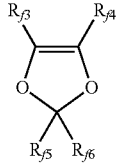

wherein each of $R_{f3}$, $R_{f4}$, $R_{f5}$, $R_{f6}$, equal or different each other, is independently a fluorine atom, a $C_1$-$C_6$ fluoro(halo)fluoroalkyl, optionally comprising one or more oxygen atom.

9. The composition according to claim 1, wherein component (I) further comprises recurring units derived from bis-olefin.

10. The composition according to claim 9, wherein said bis-olefin is selected from the group comprising:

$R_1R_2C=CH-(CF_2)_j-CH=CR_3R_4$ wherein j is an integer between 2 and 10, and $R_1$, $R_2$, $R_3$, $R_4$, equal or different from each other, are —H, —F or $C_1$-$C_5$ alkyl or (per)fluoroalkyl group;

$A_2C=CB-O-E-O-CB=CA_2$, wherein each of A, equal or different from each other, is independently selected from —F, —Cl, and —H; each of B, equal or different from each other is independently selected from —F, —Cl, —H and —$OR_B$, wherein $R_B$ is a branched or straight chain alkyl radical which is optionally partially or completely fluorinated or chlorinated; E is a divalent group having 2 to 10 carbon atoms, optionally fluorinated, which optionally includes ether linkages; and $R_6R_7C=CR_5$-E-O—CB=$CA_2$, wherein E, A and B have the same meaning as above defined; $R_5$, $R_6$, $R_7$, equal or different from each other, are —H, —F or $C_1$-$C_5$ alkyl or fluoroalkyl group.

11. A method for manufacturing composition (C) according to claim 1, said method comprising:
(i) providing a composition (C1) comprising component (I) in a first liquid medium (I);
(ii) diluting said composition (C1) with a liquid medium (d), so as to obtain a diluted composition (dC1) in a diluted liquid medium (dI) comprising said component (I) in an amount of less than 10 wt. % with respect to the total weight of said composition (dC1);
(iii) mixing said composition (dC1) with a composition (C2) comprising component (II) in a second liquid medium (II), so as to provide a diluted mixed composition (dC3) in a third liquid medium (III) comprising a weight ratio between said component (I) and said component (II) of from 95/5 to 70/30, and
(iv) removing a portion of said medium (III) from said composition (dC3), so as to provide composition (C) comprising medium (L), component (I) and component (II), wherein said component (I) and said component (II) are in an amount of at least 15 wt. % based on the total weight of said composition.

12. The method according to claim 11, wherein said weight ratio between said component (I) and said component (II) is from 90/10 to 80/20.

13. An article comprising composition (C) according to claim 1.

14. A method for manufacturing a proton exchange membrane, said method comprising:
(A) casting composition (C) according to claim 1 to obtain a film or impregnating said composition (C) onto a porous support to obtain an impregnated support;
(B) removing medium (L) from said film to obtain a dried film or from said impregnated support to obtain a dried impregnated support; and
(C) heating said dried film or said dried impregnated support at a temperature between 140° C. and 230° C. to obtain a proton exchange membrane.

15. The composition according to claim 10, wherein j is an integer between 4 and 8.

16. The composition according to claim 10, wherein E is a —$(CF_2)_z$— group, with z being an integer from 3 to 5.

17. The composition according to claim 1, wherein component (II) comprises recurring units derived from tetrafluoroethylene (TFE) and perfluoromethyl-vinyl-ether (MVE).

18. The article according to claim 13, wherein said article is a proton exchange membrane.

* * * * *